United States Patent [19]

McIntyre

[11] Patent Number: 4,971,821

[45] Date of Patent: Nov. 20, 1990

[54] METHOD OF THERMALLY PROCESSING SEAFOOD AND PACKAGE HAVING THE SEAFOOD THEREIN

[75] Inventor: Deborah J. McIntyre, Palatine, Ill.

[73] Assignee: American National Can Company, Chicago, Ill.

[21] Appl. No.: 341,267

[22] Filed: Apr. 21, 1989

Related U.S. Application Data

[63] Continuation of Ser. No. 142,345, Dec. 29, 1987, abandoned, which is a continuation of Ser. No. 891,306, Jul. 28, 1986, abandoned, which is a continuation-in-part of Ser. No. 747,590, Jun. 24, 1985, abandoned, which is a continuation-in-part of Ser. No. 695,463, Jan. 28, 1985, abandoned.

[51] Int. Cl.$^5$ .......................... A23B 4/005; A23B 4/12
[52] U.S. Cl. ..................................... 426/325; 426/106; 426/129; 426/332; 426/324
[58] Field of Search ............... 426/129, 113, 412, 324, 426/325, 326, 399–401, 407, 332, 643, 262, 268

[56] References Cited

U.S. PATENT DOCUMENTS

| | | | |
|---|---|---|---|
| 1,686,393 | 10/1928 | Oshima | 426/643 |
| 2,381,019 | 8/1945 | Webb | 426/325 |
| 2,448,970 | 9/1948 | Ganucheau | 426/325 |
| 2,627,473 | 10/1950 | Brissey . | |
| 3,038,810 | 6/1962 | Ackerboom et al. . | |
| 3,122,442 | 2/1964 | Sair . | |
| 3,245,799 | 4/1966 | Matz . | |
| 3,275,450 | 9/1966 | Holstein | 426/552 |
| 3,328,178 | 6/1967 | Alderton | 426/332 |
| 3,492,128 | 1/1970 | Brennan et al. . | |
| 3,526,521 | 9/1970 | Komarik . | |
| 3,658,551 | 4/1972 | Bundus et al. | 426/332 |
| 3,852,486 | 12/1974 | Walker et al. | 426/332 |
| 3,985,904 | 10/1976 | Bernotavicz | 426/332 |
| 4,011,346 | 3/1977 | Ernst | 426/335 |
| 4,191,787 | 3/1980 | Bavermann | 426/643 |
| 4,262,027 | 4/1981 | Tonner et al. | 426/643 |
| 4,279,935 | 7/1981 | Kentor | 426/332 |
| 4,564,527 | 1/1986 | Bacako et al. | 426/335 |
| 4,741,911 | 5/1988 | McIntyre et al. | 426/324 |

FOREIGN PATENT DOCUMENTS

| | | | |
|---|---|---|---|
| 1071920 | 2/1980 | Canada | 426/407 |
| 0128610 | 12/1984 | European Pat. Off. . | |
| 2514110 | 10/1976 | Fed. Rep. of Germany | 426/643 |
| 2921041 | 11/1979 | Fed. Rep. of Germany | 406/407 |
| 46-36180 | 10/1971 | Japan | 426/332 |
| 46-39059 | 11/1971 | Japan | 426/643 |
| 47-10984 | 4/1972 | Japan | 426/332 |
| 53-96355 | 8/1978 | Japan | 426/643 |
| 56-78577 | 6/1981 | Japan | 426/332 |
| 58-138337 | 8/1983 | Japan | 426/324 |
| 58-179470 | 10/1983 | Japan | 426/643 |
| 59-42838 | 3/1984 | Japan | 426/324 |
| 59-66861 | 4/1984 | Japan | 426/643 |
| 8063 | of 1887 | United Kingdom | 426/325 |

OTHER PUBLICATIONS

Fish as Food, Borgstrom, vol. IV, 1965, Academic Press.
CRC Handbook of Food Additives, 2nd Ed., vol. I, 1972, Furia, CRC.
Elements of Food Technology, Desrosier, 1977, AVI.
Industrial Fishery Technology Standby, 1963, Reinhold Publ.
Consumers Dictionary of Food Additives, Winter Crown Publishers, 1972, p. 115.
Fermo Biochemics/Finnsugar Brochures, no date.
Pfizer Technical Bulletin No. 93, 6/61 (Exhibit 8).
Monograph on Glucono–delta–lactone, 6/78, Informatics Inc.
LaBell, "Pickled Foods with Less Vinegar Offer New Flavor Possibilities", *Food Development*, 1981.
Andres, "Lowers pH of Acidified Foods without Strong Acid Taste", *Food Processing*, 1981.
Andres, "Acidulants", *Food Processing*, May 1985, vol. 46, No. 5 (Exhibit 20).
Sognefest et al., "Effect of pH on Thermal Process Requirements of Canned Foods", *Food Research*, 1948, vol. 13, No. 5, pp. 400–416, (Exhibit 25).
*Food Manufacturer*, Sep. 1981.

*Primary Examiner*—Steven Weinstein
*Attorney, Agent, or Firm*—Wyatt, Gerber, Burke and Badie

[57] ABSTRACT

Thermally processing seafood, e.g., shrimp, sardines, or salmon, in the presence of a mixture of an acid and its lactones, preferably a mixture of an aldonic acid and its lactones whereby, without need for salt, the texture and flavor of the seafood are maintained through thermal processing and storage. Also, a package having a thermally processed seafood product and gluconic acid therein. The preferred mixture is obtained by combining the seafood with glucono-delta lactone, and the mixture is comprised of gluconic acid with its lactones, glucono-delta lactone and glucono-gamma lactone.

9 Claims, No Drawings

METHOD OF THERMALLY PROCESSING SEAFOOD AND PACKAGE HAVING THE SEAFOOD THEREIN

CROSS-REFERENCE TO RELATED APPLICATIONS

This application is a continuation of application Ser. No. 142,345 filed Dec. 29, 1987 which is a continuation of application No. 891,306 filed July 28, 1986, which is a continuation-in-part of application Ser. No. 747,590 filed June 24, 1985 which is, in turn, a continuation-in-part of application Ser. No. 695,463 filed Jan. 28, 1985, all of which are now abandoned.

FIELD OF THE INVENTION

This invention relates to the thermal processing of shrimp and other seafoods, which at present have to be heavily salted to retain their texture during commercial sterilization processing and storage.

BACKGROUND

Some seafood has to be heavily salted, i.e., needs to be thermally processed in a 4 to 5% brine, in order to retain an acceptable texture. By "thermal processing" is meant the seafood has been subjected to a time/temperature parameter which results in a "commercially sterilized" food, as defined in Title 21 CFR Part 113 (Definitions, Sec. 113.3) "Commercial sterility of thermally processed food means the condition achieved—
"(i) By the application of heat which renders the food free of—
 "(a) Microorganisms capable of reproducing in the food under normal nonrefrigerated conditions of storage and distribution; and
 "(b) Viable microorganisms (including spores) of public health significance; or
"(ii) By the control of water activity and the application of heat, which render the food free of microorganisms capable of reproducing in the food under normal nonrefrigerated conditions of storage and distribution."

Texture herein generically refers to firmness in relation to touch and bite, and to material consistency and physical integrity. According to the present state of the art, if salt is not used, there is a loss of texture during thermal processing resulting in lack of firmness and resistance to one's bite, which is deemed unacceptable by many people.

From the moment of the death of the seafood item, e.g., the shrimp, sardines, or salmon, there is a deterioration in texture due to enzymatic and bacterial action. The result is a breakdown of the connective tissue. Although enzymatic action is largely terminated by the blanching process, blanched shrimp are still extremely heat sensitive, and further loss of texture can occur due to the elevated temperatures involved in thermal processing. Conventionally, a heavy dosage of salt (4 to 5% in the brine) is added to help preserve the texture of the blanched shrimp which would otherwise be degraded during thermal processing.

Some seafoods such as shrimp are presently heavily salted both during the blanch and also in the brine immediately prior to thermal processing (usually 5% by weight sodium chloride in the brine) in order to retain the texture. The consumer ordinarily removes some salt from the shrimp by a water wash or leach before the product is served. Nonetheless, considerable salt is or may be retained in the shrimp in a quantity which many medical authorities consider inimical to health, notably inducement of hypertension due to sodium retention.

Protein foods such as seafood contain sulfur compounds which may break down to react with exposed metal to produce a dark discoloration found in cans of protein-containing foods. Although the dark sulfide compound formed is harmless to consumer health, it detracts from the appearance of the can and when transferred to the product detracts from the appearance of the product.

Scientific studies have shown that the amount of sulfide released from seafood during thermal processing can be related to the acidity of the product. Seafoods, and particularly shell fish, have a tendency toward rapid degradation prior to canning with resultant high pH. Good handling conditions such as prompt icing and rapid processing are very important since they affect pH level and sulfide formation. Acidification reduces the pH and the consequent likelihood of black iron sulfide formation. Citric acid is frequently added to the canning brine by shrimp canners in an attempt to inhibit sulfide build-up and consequent product discoloration, but treatment with citric acid does not always fully inhibit build-up. This build-up is most likely to occur at exposed metal at the side seam of a three-piece metal can, at the countersink area, or on the profile rings of the container end.

One of the objects of the present invention is to produce canned seafood, for example, shrimp, which compares favorably with the fresh or frozen product which is not thermally processed. Another object is to retain the texture of seafood, for example, during thermal processing and storage by a treatment other than heavy salting, by combining an acid and its lactones, preferably an aldonic acid and its lactones, with the shrimp, to be processed with little or no salt added, thereby retaining a flavor closer to that of the fresh product. Further objects of the invention are to avoid the need to soak salt from the product before consumption and to improve the flavor by this substantial reduction in salt level. An added advantage is the reduction in discoloration of the seafood and of the metal can in which the seafood may be packed. It is also an object of the present invention to effect the above objectives by thermally processing seafood, for example, shrimp, sardines, or salmon, in the presence of an aldonic acid, preferably gluconic acid, which replaces salt for retaining texture.

Still another object of the invention is to provide commercially sterilized shrimp which has a clean shrimp flavor and odor.

Practice of this invention eliminates the need for or the use of citric acid in brine to reduce black iron sulfide formation and consequent product discoloration. When an aldonic acid lactone such as glucono-delta lactone is hydrolyzed to gluconic acid, the gluconic acid can perform the same inhibiting action as citric acid. Thus, when GDL is used alone in the brine, neither salt nor citric acid needs to be included since the gluconic acid formed from hydrolysis of the GDL performs these texturing and inhibiting functions.

SUMMARY OF THE INVENTION

An aldonic acid, preferably gluconic acid, is found to maintain the texture of seafood, e.g., shrimp, making it unnecessary to employ large amounts of salt for this purpose prior to or during commercial sterilization of the product. Only small amounts of gluconic acid are necessary compared to the large amounts of salt previously required. For example, in accordance with the preferred method of combining gluconic acid with Louisiana shrimp, adding ½% to less than 1½% (by weight) glucono-delta lactone (GDL) to an aqueous solution is adequate; a level greater than 1½% tends to reduce the appeal. This amounts to from 0.2 to 1.1% by weight of hydrolysis mixture of aldonic acid and its lactones based on the weight of the seafood. A small amount of salt may still be used in the blanch before sterilizing, but this is far from the amount normally needed to maintain good texture during the conventional canning process in the absence of 4 to 5% salt in the brine. When the present invention is applied to shrimp, preferably the harvested shrimp is first blanched and rinsed, filled into the container, and afterwards GDL (or another, aldonic lactone) brine is added to fill the container; the container is then hermetically sealed and thermally processed. Because of the addition of an aldonic acid with its lactones, e.g., by combining the seafood with aldonic lactones, and the hydrolysis of the aldonic lactones to a mixture of aldonic acids and their lactones, the resulting shrimp has a texture and flavor similar to that of the fresh product when cooked. The levels and mild taste of the aldonic acids and the presence of the acid with its lactones result in a thermally processed seafood that does not have any harsh acidic notes in flavor or aroma. The flavor is also improved by the substantial reduction in salt level. There are a less fishy aroma and less amine formation.

DETAILED DESCRIPTION OF THE INVENTION

In accordance with this invention, the need for large amounts of added salt or of any added salt at all for maintaining the texture of certain seafoods, for example, shrimp, sardines, or salmon, through thermal processing is eliminated by combining the seafood with a mixture of an aldonic acid and its lactones, preferably gluconic acid and its lactones, and thermally processing the combination. It has been discovered that by combining a mixture of an aldonic acid and its lactones with seafood to be thermally processed, not only are the need for salt for texturizing and the salty taste eliminated or substantially reduced, but also the levels and mild taste of the acid present and the presence of the acid with its lactones, result in a thermally processed seafood that does not have the objectionable pungent, sharp, acidic or pickled flavor notoriously characteristic of those acids used in foods, e.g., acetic, citric, lactic, malic, hydrochloric, phosphoric, or tartaric acid. Moreover, it does not have the strong amine-type, fishy aroma or flavor associated with fish that are slightly degraded, nor does it have an acid taste.

The aldonic acids which can be combined with the seafood in accordance with this invention are prepared, for example, by oxidation of sugars or aldoses, preferably from those having six carbon atoms, although they could be prepared from those having five carbon atoms. Those acids prepared from sugars having six carbon atoms are talonic, galactonic, idonic, gulonic, mannonic, gluconic, altronic, and allonic (although currently these acids, with the exception of gluconic, may be unavailable commercially). These acids are respectively derived from their aldoses—talose, galactose, idose, gulose, mannose, glucose, altrose, and allose, respectively. Sugars having five carton atoms are lyxose, xylose, arabinose and ribose. Those skilled in the art will understand from this disclosure regarding the six and five carbon atom aldonic acids, that other acids which form their own lactone(s) and mixtures of other acids and their lactones, which perform the same functions and objectives of this invention, particularly regarding eliminating or substantially reducing salt for texturizing and regarding lack of an objectionable acid taste in the processed seafood, would be within the scope of this invention. For example, aldaric acids, i.e., dibasic acids such as glucaric acid, which forms saccharo lactone, might be employed.

Any suitable method or material can be employed to bring the aldonic acid and its lactones into combination with the seafood. While the acid might be added by itself (since the acid, when in contact with moisture or water in the seafood contents, will be converted to a mixture of the acid and its lactones), doing so currently does not appear practical since aldonic acids are not known to applicants to be commercially available in crystalline form or in food grade. This is the case with the preferred gluconic acid. These acids may be commercially available in technical grade in aqueous solutions. For example, gluconic acid is so available in aqueous solutions stated to be about 50% (by weight) gluconic acid. These aqueous solutions of the acid are equilibrium mixtures of gluconic acid and its lactones glucono-delta lactone and glucono-gamma lactone. Gluconic acid has a mild acid taste.

The preferred method for providing the aldonic acid and its lactones to the seafood is to combine the seafood with a precursor of the aldonic acid. A precursor of the acid herein means a liquid, material, or compound which adds the acid to, or forms or provides it in the seafood with which it is combined. Again, when the acid contacts moisture or water in or of the seafood, it will convert partially to and will exist with its lactones. Precursors of these acids which can be employed include their lactones themselves (which can be said to be latent acids since they hydrolyze in water to form a mixture of the acid and its lactones), mixtures of these lactones, and salts of the acids in combination with certain strong acids. For example, precursors of the preferred gluconic acid which can be employed include glucono-delta lactone, glucono-gamma lactone, mixtures of these lactones, and gluconate salts in combination with the strong acid, hydrochloric acid.

By far, the most preferred precursor for this invention is glucono-delta lactone (GDL). It is commercially available in food grade as a free-flowing odorless white powder. It has an initial sweet taste. Food grade solutions of GDL are also commercially available and can be employed. GDL is an inner ester of gluconic acid which when hydrolyzed forms gluconic acid. Hydrolysis occurs when GDL is combined with water, for example, that of an (aqueous) brine or in the seafood. Hydrolysis of the glucono-delta lactone results in an equilibrium mixture of from about 55% to about 60% by weight of gluconic acid and from about 45% to about 40% by weight of a mixture glucono-delta lactone and glucono-gamma lactone. The rate of acid formation is affected by the temperature, the pH value, and concentration of the solution. Hydrolysis of delta lactones tends to be more rapid than hydrolysis of gamma lactones. In the absence of heat, hydrolysis tends to be slow. Heating the brine accelerates the hydrolysis reaction and is the preferred method. Heating the seafood also has the same effect. Like results would be expected to occur with the use of other lactones of other aldonic acids, e.g., galactono-delta lactone.

Examples of those salts which can be used in combination with certain strong acids, each suitable for food use, include sodium, potassium, and calcium salts, for example, sodium, potassium and calcium gluconates. An example of an acid considered herein to be "strong" is one which will react with the acid salt and provide enough available hydrogen ions to form the desired aldonic acid in the seafood. Such an acid would be hydrochloric acid. Of course, the type, manner, and/or amount of strong acid(s) employed should be such that in accordance with the objectives of this invention, a sharp, strong or objectionable acid taste is not imparted to the seafood. If hydrochloric acid is used as the strong acid, all of it should be converted so that no such acid would remain, only some derived salt.

EXAMPLES

Example 1

Louisiana shrimp, freshly caught, were mechanically peeled and deveined. The shrimp were of medium size, which means a count of 5.4 to 9.7 per ounce of drained product. The pH of the raw shrimp to be processed ranged from 7.1 to 7.3. The shrimp were blanched for 1½ minutes at 200° F. in a continuous blancher. The blanch solution was an aqueous solution containing 3.95% salt by weight and heated to 200° F. The shrimp were rinsed after the blanch to cool the shrimp, and they were graded and immediately filled into cans (307×113; meaning 3 7/16 inches diameter, 1 13/16 inches high). The rinse removed some of the salt. Each can was checkweighed to assure a fill weight of 4.3 oz. After filling, the commercial control cans (CC, Table 1) were passed through a conventional drip line whereby the cans were filled with a brine solution which contained 4.8–5.0% salt by weight.

In accordance with the present invention the commercial brine solution was replaced with brine solutions to which had been added various amounts of GDL and 1.3% by weight salt dissolved in water. These brines were heated to 180°–190° F. and employed as the canning brine for a series of other 307×113 cans (refer to Table 1, below). The GDL in the brines undergoes hydrolysis and thereby provides in the brine a solution in which from about 55% to 60% by weight of the GDL added is in the form of gluconic acid and from about 45% to 40% by weight of the GDL added is in the form of a mixture of glucono-delta lactone and glucono-gamma lactone.

All cans were steam-flow closed and were thermally processed in vertical still retorts. The thermal process used for the control cans and those of the present invention was a retort temperature of 261° F. for 5.43 minutes. The cans were atmospherically water-cooled to about 100° F. after processing and both sets of cans were stored at a controlled temperature of 80° F. The objective was to monitor the differences between the various can to which GDL had been added and the commercial control cans in terms of the sensory characteristics of odor, color, flavor, and texture, based upon the GDL variable.

Two cans of each of the following code variables shown in Table 1 were submitted to a trained taste panel whose evaluations are given in Table 2.

TABLE 1

| Code Variables | % GDL added to the brine | % GDL Based upon Shrimp Weight | % Salt Added to the brine |
| --- | --- | --- | --- |
| B | 0 | 0 | 1.3* |
| C | 0.5 | 0.35 | 1.3* |
| D | 1.0 | 0.7 | 1.3* |
| F | 1.5 | 1.05 | 1.3* |
| CC (Commercial Control) | 0 | 0 | 5 |

*Amount added to avoid a bland taste.

TABLE 2

| Sample Code | Aroma | Flavor | Texture | Color |
| --- | --- | --- | --- | --- |
| B | Some fishy note | Somewhat fishy | Soft or mushy | Slight gray pink |
| C | Very slight loss of fishy note | Cleaner shrimp note than the control | Slightly firm | Bright pink-red |
|   | Three panel members reported an off-note described as slightly harsh, pungent or (amine) like |   |   |   |
| D | Best aromatics of all samples. Fishy note decreased and shrimp note most evident; another comment was it had clean aroma | Better than control because of clean shrimp flavor with slightly sweet flavor | Firm | Bright pink-red |
| F | Slight loss of aromatics | Downgraded because: slightly acid flavor, lower shrimp flavor | Flaky dry; firmest, too firm | Slightly less pink-red |
| CC | Shrimp house or fishy | Extremely salty, somewhat fishy | Firm | Bright pink-red |

It was also noted by the panel that the cloudiness of the liquid (brine) in the can was obvious at the 1.5% GDL brine addition level, but barely noticeable at the 0.5% level. These liquids are termed "brine" in the canning industry regardless of salt content. Because of brine cloudiness at the 1.5% GDL level and the downgraded flavor, the preferred range of addition of GDL to brine for use with small and medium Louisiana shrimp under the present invention is from about 0.5 to less than 1.5 percent by weight in water. Conceivably some GDL (a fraction of a percent) may be replaced by a small amount of an organic acidulant, such as citric or lactic acid, to still achieve equivalent results in accordance with this invention, and a small amount of salt (NaCl) may be used to boost or encourage the seafood flavor. Citric acid is not known to have ever been used to replace salt for texturing but has been used to prevent sulfide deposits.

Example 2

Four frozen Pacific pink salmon (deheaded and eviscerated) were thawed. Each salmon was skinned, deboned, and cut into pieces of appropriate size.

The containers used were 2-piece 307×112 (meaning 3-7/16 inches diameter, 1 12/16 inches high) enameled cans. Six ounces of thawed fish were weighed into each can containing .0.06 oz. salt (1.0% by weight of fish). The fish of Sample 6 was dipped for 30 seconds in a solution containing 20% GDL before it was filled into cans.

Sample 1 was filled with deionized water and Sample 2 with soybean oil. In accordance with the present invention, the commercial brine solution was replaced in Samples 3 to 5 with brine solutions to which had been added various amounts of GDL. Table 1 describes the levels of GDL used and the resulting pH of the fish. All of the brines were heated to 180°-190° F.

All cans were topped to an aim headspace of ¼" and were closed under 25" vacuum. The thermal process used for all cans was a retort temperature of 248° F. for 65 minutes followed by an atmospheric water cool to about 100° F. The cans were processed in a vertical still retort.

The make-up of the brine solutions employed and the pH of the salmon are set forth in the following table:

TABLE 3

| Sample | Brine Solution* | % GDL Added to the Brine** | pH of Salmon 24 hours after processing |
|---|---|---|---|
| 1 | Deionized Water | 0 | 6.4 |
| 2 | Soybean Oil | 0 | — |
| 3 | Soybean Oil | 0.8 | 5.7 |
| 4 | Deionized Water | 0.8 | 5.8 |
| 5 | Deionized Water | 0.4 | 6.0 |
| 6 | Deionized Water | 20.0% Dip | 5.7 |

*Each brine contained 1% salt by weight of the salmon.
**Based upon the weight of the fish.

The differences between the various cans to which GDL had been added and the control cans in terms of the sensory characteristics of appearance, aroma, texture, and color were informally evaluated. These are summarized in the following table:

TABLE 4

| Sample | Appearance | Aroma | Texture | Color |
|---|---|---|---|---|
| 1 | White Coagulation | Cooked Aroma | Softest | White |
| 2 | White Coagulation | — | Soft | White |
| 3 | Slight Coagulation | — | Firm | Light Pink |
| 4 | No Coagulation | Best Aroma | Firm | Pink |
| 5 | No Coagulation | — | Slightly Firm | Light Pink |
| 6 | No Coagulation | Acidic | Dry | Darkest Pink |

It was noted that GDL, even at low levels, prevents the formation of curd (coagulated soluble proteins) on the fish surface. Curd is typical in salmon which are frozen before canning but can also form in fish packed fresh. Curd formation lowers both grade and economic value of the product.

The firmness of the salmon is related to the amount of GDL used in the brine. The more GDL in the brine, the firmer the processed salmon was after process. Salmon was most liked when the brine contained GDL at the 0.8% level. The texture was firm and also the taste was preferred among all the variables.

The variables with GDL also had more typical pink salmon color than the controls. The dipped salmon had the most intense pink color.

The preferred range of addition of GDL to brine for use with Pacific pink salmon under the present example is about 0.8% by weight in water. If one preferred adding GDL to the product by dipping into a GDL solution, much higher concentrations of GDL in solution would be required.

Overall, Sample 4 had the best characteristics and was superior to the control variable. This sample had the best odor characteristics and was a desirable, pink color.

Example 3

Ten ¼ lb. rectangular (405×301×014.5) cans of each sample were prepared by adding 20 ml of brine acid solution to the empty cans and then transferring freshly trimmed, raw sardines from other cans into the test cans. The test cans were placed in racks which were placed in the bottom of a cart containing 40 racks of cans to avoid any possible contamination of regular fish through overflow of liquid in the steam box. The cart was wheeled into the steam box where it was treated with live steam at atmospheric pressure for 35 minutes. The test racks were removed while still in the upright position so that the pH of the brine and fish in each sample could be checked.

One can of each sample was checked after cooling to room temperature. The pH of the decanted brine was checked, and then the drained fish was blended with 60 ml of distilled water added to make a satisfactory blended slurry. The results of the pH evaluation shown in Table 5 indicate that acidification during steaming was ineffective. Thus, additional acid was added to Samples 2 and 3 prior to closing.

TABLE 3

| | pH Check after Steaming | |
|---|---|---|
| Sample | Brine | Fish + Water |
| 1 | 6.17 | 6.25 |
| 2 | 4.68 | 6.25 |
| 3 | 6.17 | 6.25 |

The amount of the acid, i.e. GDL or citric acid, added per can to Samples 2 and 3 both before and after steaming are set forth in Table 6, based on an average drained weight of fish of 120 gm per can:

TABLE 6

| Sample | GDL Added Before Steaming % Wt. of Fish | GDL Added Before Closing % Wt. of Fish | Citric Acid Added Before Closing % Wt. of Fish |
|---|---|---|---|
| 1 | 0 | 0 | — |
| 2 | 0.67 | 0.33 | — |
| 3 | 0 | .830 | 0.17 |

The test cans were drained manually and put into the line for addition of oil and closing. The nine remaining cans of Sample 2 had 2.0 ml of 20% GDL concentrate solution added prior to filling with oil. Sample 3 cans had 5 ml of 20% GDL concentrate containing 4% citric acid added prior to filling with oil. Cans were then retorted for 74 minutes at 238° F., which is the normal cook. The test cans were placed in bags to separate them from the other cans in the retort. After cooling, one can of each of Samples 1, 2, and 3 was checked for pH of the brine, the fish drained and blended with distilled water, pH checked, and the fish and brine recombined. Addition of 60 ml of distilled water was necessary to obtain a satisfactory blended fish paste. The results of this check are given in the following table:

TABLE 7

| Sample | Brine pH | Fish & Water pH | Fish & Brine pH |
|---|---|---|---|
| 1 | 6.36 | 6.45 | 6.43 |
| 2 | 5.44 | 6.24 | 6.18 |
| 3 | 3.46 | 5.87 | 5.72 |

The results in Table 7 show that the brine in Sample 3 is well below a pH of 4.6, but the fish, while reduced slightly in pH, were still not below 4.6 pH.

Cans from each of Samples 1, 2, and 3 were evaluated by three regular fish graders of the Maine Sardine Council as well as an officer of the Council. Their comments were as follows:

TABLE 8

| Sample | Tasters' Comments |
|---|---|
| 1 | Good, slightly low in salt, slightly soft |
| 2 | Clean odor, less fishy, texture slightly firmer, no acid flavor |
| 3 | More of a difference, definitely low in salt, slight burning in back of mouth |

Hence, while preferred embodiments of the invention have been described, it is to be understood these are capable of variation and modification and therefore the invention is not to be limited to the precise details set forth, the invention being broad enough to include such changes and alternations which are equivalent or fall within the purview of the following claims.

I claim:

1. The method of thermally processing seafood normally thermally processed in an aqueous brine containing 4 to 5% by weight salt to maintain the texture of said seafood during thermal processing of said seafood to commercial sterility which comprises mixing said seafood in an aqueous brine consisting essentially of an hydrolysis mixture of an aldonic acid and its lactones or a precursor thereof and a lesser amount of salt than is normally employed to maintain said texture wherein the amount of aldonic acid and its lactones or precursor thereof is from about 0.2 to about 1.1 percent by weight based on the weight of the seafood, hermetically sealing said seafood and said brine in a container and then thermally processing said seafood to commercial sterility, the amount of hydrolysis mixture or precursor thereof being such that said texture of said seafood is maintained during said thermal processing compared to the same seafood thermally processed without said hydrolysis mixture or precursor thereof in a brine containing said amount of salt normally employed for the processing of said seafood.

2. The method according to claim 1 wherein the seafood is salmon.

3. The method according to claim 1 wherein the seafood is sardines.

4. The method according to claim 1 wherein the seafood is shrimp.

5. The method according to claim 1, 2, 3 or 4 wherein the hydrolysis mixture is a mixture of gluconic acid and its lactones or a precursor thereof.

6. The hermetically sealed container containing seafood which has been processed according to the method of claim 1.

7. The container of claim 6 wherein the seafood is salmon.

8. The container of claim 6 wherein the seafood is sardines.

9. The container of claim 6 wherein the seafood is shrimp.

* * * * *